(12) United States Patent
Cech et al.

(10) Patent No.: US 8,296,012 B2
(45) Date of Patent: Oct. 23, 2012

(54) VEHICLE COMMUNICATION SYSTEM AND METHOD

(75) Inventors: Leonard Cech, Brighton, MI (US); Michael Edmund O'Boyle, Howell, MI (US)

(73) Assignee: TK Holdings Inc., Auburn Hills, MI (US)

( * ) Notice: Subject to any disclaimer, the term of this patent is extended or adjusted under 35 U.S.C. 154(b) by 783 days.

(21) Appl. No.: 12/292,150

(22) Filed: Nov. 12, 2008

(65) Prior Publication Data

US 2009/0192677 A1 Jul. 30, 2009

Related U.S. Application Data

(63) Continuation-in-part of application No. 12/213,591, filed on Jun. 20, 2008.

(60) Provisional application No. 60/996,351, filed on Nov. 13, 2007, provisional application No. 61/006,298, filed on Jan. 4, 2008.

(51) Int. Cl.
*A01B 69/00* (2006.01)
*B62D 6/00* (2006.01)
*B62D 11/00* (2006.01)

(52) U.S. Cl. ........................................................ 701/41

(58) Field of Classification Search .................. 455/99, 455/556; 701/41
See application file for complete search history.

(56) References Cited

U.S. PATENT DOCUMENTS

| | | | |
|---|---|---|---|
| 4,850,015 A | 7/1989 | Martin | |
| 5,666,102 A | 9/1997 | Lahiff | |
| 5,758,311 A | 5/1998 | Tsuji et al. | |
| 5,821,935 A | 10/1998 | Hartman et al. | |
| 5,850,458 A | 12/1998 | Tomisawa et al. | |
| 7,775,884 B1 | 8/2010 | McCauley | |
| 7,786,886 B2 | 8/2010 | Maruyama et al. | |
| 2002/0068605 A1* | 6/2002 | Stanley | 455/556 |
| 2002/0135163 A1 | 9/2002 | Derrick | |
| 2003/0064748 A1 | 4/2003 | Stulberger | |
| 2003/0182810 A1 | 10/2003 | Sano | |
| 2004/0030458 A1 | 2/2004 | Entenmann | |
| 2004/0138882 A1 | 7/2004 | Miyazawa | |
| 2005/0189159 A1 | 9/2005 | Weber et al. | |
| 2006/0070795 A1 | 4/2006 | Meissner | |
| 2006/0115103 A1 | 6/2006 | Feng et al. | |
| 2006/0188107 A1 | 8/2006 | Inoue et al. | |
| 2006/0285697 A1 | 12/2006 | Nishikawa et al. | |

(Continued)

FOREIGN PATENT DOCUMENTS

DE 100 13 432 C1 9/2001

(Continued)

OTHER PUBLICATIONS

International Search Report issued by Korean Intellectual Property Office dated Jun. 16, 2009 for International Application No. PCT/US2008/083404.

(Continued)

*Primary Examiner* — James Trammell
*Assistant Examiner* — Michael D Lang
(74) *Attorney, Agent, or Firm* — Foley & Lardner LLP

(57) ABSTRACT

A vehicle communication system and communication steering wheel is provided. The communication steering wheel includes a display, a wireless transceiver configured to operably connect to a wireless device, a sensor, configured to obtain directional steering information and a controller, configured to receive input from the wireless transceiver and the sensor and output a signal to the display based on the received input.

9 Claims, 3 Drawing Sheets

U.S. PATENT DOCUMENTS

| | | | |
|---|---|---|---|
| 2006/0286944 A1* | 12/2006 | Songwe, Jr. | 455/99 |
| 2007/0127736 A1 | 6/2007 | Christoph | |
| 2007/0238491 A1* | 10/2007 | He | 455/569.2 |
| 2007/0257889 A1* | 11/2007 | Croy | 345/170 |
| 2008/0023253 A1 | 1/2008 | Prost-Fin et al. | |
| 2008/0061954 A1* | 3/2008 | Kulas | 340/438 |
| 2008/0143505 A1* | 6/2008 | Maruyama et al. | 340/441 |
| 2009/0192795 A1 | 7/2009 | Cech | |
| 2010/0295670 A1 | 11/2010 | Sato et al. | |

FOREIGN PATENT DOCUMENTS

| | | |
|---|---|---|
| DE | 10 2004 042 331 A1 | 12/2005 |
| JP | 2001-253219 | 9/2001 |
| JP | 2003-195890 | 7/2003 |
| JP | 2004-338442 A | 12/2004 |
| JP | 2005231622 | 9/2005 |
| JP | 2006151192 | 6/2006 |
| JP | 2006264615 | 10/2006 |
| KP | 2000 0017980 A | 4/2000 |
| KR | 2000-0017980 | 4/2000 |
| KR | 2002-088912 A | 11/2002 |
| KR | 2005-0089253 | 9/2005 |
| KR | 2006 0026157 | 3/2006 |
| WO | WO 2006/076903 A1 | 7/2006 |
| WO | WO 2006/076904 A1 | 7/2006 |
| WO | WO-2007/021263 A1 | 2/2007 |

OTHER PUBLICATIONS

International Search Report dated Sep. 29, 2009 for International Application No. PCT/US2009/048015.

International Search Report and Written Opinion mailed May 13, 2010, received in International application No. PCT/US2009/063822.

Written Opinion and International Search Report mailed Apr. 14, 2009, received in corresponding International Application No. PCT/US2008/083393 (6 pgs.).

U.S. Appl. No. 12/292,149, filed Nov. 12, 2008, Leonard Cech

Office Action in U.S. Appl. No. 12/292,149 dated Apr. 14, 2011; 7 pages.

Office Action in U.S. Appl. No. 12/292,149 dated Sep. 8, 2011; 9 pages.

US Office Action is U.S. Appl. No. 12/213,591 dated Apr. 1, 2011; 11 pages.

Communication (Supplementary EP Search Report) in EP Appln No. 08849392.9 dated Nov. 3, 2011.

Communication (Supplementary EP Search Report) in EP Appln No. 08849994.2 dated Oct. 27, 2011.

Communication (Supp EP Search Report) in EP Appln No. 09767859.3 dated Mar. 29, 2012.

Office Action in U.S. Appl. No. 12/292,149 dated Apr. 9, 2012.

* cited by examiner

VEHICLE COMMUNICATION SYSTEM AND METHOD

CROSS-REFERENCE TO RELATED PATENT APPLICATIONS

This application is a continuation-in-part of U.S. patent application Ser. No. 12/213,591 filed on Jun. 20, 2008 and also claims priority to and the benefit of U.S. Provisional Application Nos. 60/996,351 (filed Nov. 13, 2007) and 61/006,298 (filed Jan. 4, 2008), each of the foregoing applications is incorporated herein by reference in its entirety.

BACKGROUND

The present application relates generally to a system and method for providing a message to a vehicle driver. More specifically, the application relates to a system and method for facilitating communication and providing information to a vehicle driver.

Conventional vehicle navigation systems employ various displays to inform the driver of the next navigation event (e.g., maneuver or turn) and the distance to the event. Driver navigation based on simple icon information is often termed "Turn-by-Turn" navigation. Turn-by-Turn icons are conventionally presented in a small display on the driver instrument panel (IP) or in the steering wheel rim. The icons are typically only updated when a driver completes a required turn or when a new maneuver event is within a designated range.

The quality, reliability, and prevalence of vehicle navigation systems as well as map resolution and road attributes continue to rapidly improve. The National Highway Traffic Safety Administration (NHTSA) has initiated a new regulation mandating the use of electronic stability control (ESC) systems on all U.S. vehicles by the year 2013. Conventional ESC systems use a steering angle sensor to track the real-time status of the driver steering input. Vehicle inertial and wheel speed sensors can provide real-time information about vehicle dynamics. Predictive sensors such as radar, Light Detection and Ranging (LIDAR), and vision sensors can provide anticipatory information of what is in the vehicle path. Map and GPS based navigation systems can provide information on the current and pending road geometry, features and attributes. Intelligent transportation systems such as vehicle to vehicle and vehicle to infrastructure communications can provide additional information on the road and traffic situation. Each of these sensors and sources of data can provide a wide range of information that may be useful in enhancing safety or driver assistance.

A communication steering wheel device has been developed in which a variety of informational messages can be displayed to the driver primarily through icons. These messages include a variety of warning messages, informational messages about upcoming landmarks, and navigation commands. The communication steering wheel can be configured to present driver warning, assistance, and diagnostic information to the driver within his or her peripheral vision when looking at the approaching road. Currently this information is sent via a wired connection between the steering wheel and the vehicle wired network (CANbus, other any other vehicle bus). The existing connection is generally not redundant, as there are a limited number of physical connections that can exist between the steering column and the steering wheel. Accordingly, a system is needed that can facilitate communication via the communication steering wheel with other vehicle systems not connected to a wired vehicle network to provide useful information and services to the user of the vehicle.

SUMMARY

According to one embodiment, a communication steering wheel, includes a display, a wireless transceiver configured to operably connect to a wireless device; a sensor, configured to obtain directional steering information and a controller, configured to receive input from the wireless transceiver and the sensor and output a signal to the display based on the received input.

According to another embodiment, a vehicle communication system for a vehicle, includes a steering wheel, comprising a wireless transceiver configured to operably connect to a wireless device, a steering sensor, configured to obtain directional steering information and a controller, configured to receive input from the wireless transceiver and the sensor and output a signal to the display based on the received input.

According to still another embodiment, a method for providing driver guidance includes the steps of receiving navigation information from a wireless device, receiving data from one or more sensors, determining whether a current heading is accurate based on the received navigation information and received data and displaying a message to the driver based on an accuracy of the current heading.

It is to be understood that both the foregoing general description and the following detailed description are exemplary and explanatory only, and are not restrictive of the claimed subject matter.

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION

Embodiments of the disclosure will be described below with reference to the accompanying drawings. It should be understood that the following description is intended to describe exemplary embodiments, and not to limit the claimed subject matter.

Figure 1:
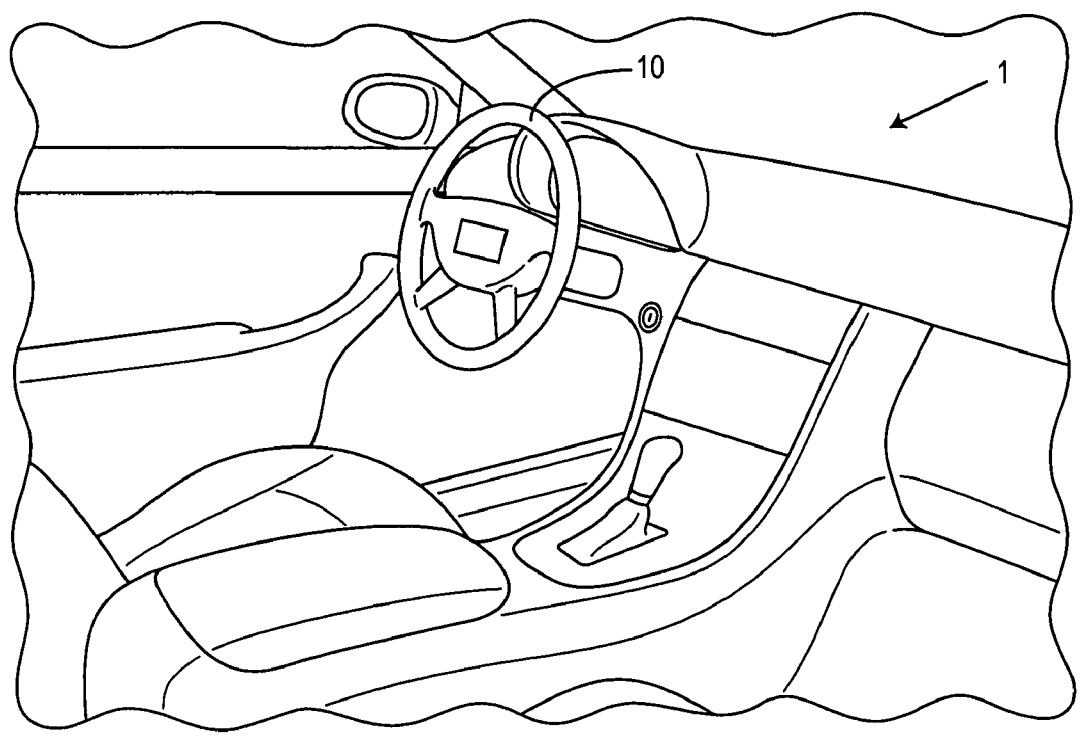
FIG. 1 is a perspective view of a vehicle cockpit, according to an exemplary embodiment.

Referring to FIG. 1, a vehicle driver may operate a vehicle from a cockpit 1. The cockpit 1 includes a communication steering wheel 10. The driver may rotate the communication steering wheel 10 to turn the vehicle wheels and steer the vehicle in a desired direction. The communication steering wheel 10 may also be configured to provide a message (e.g., a visual message, an audible message, etc.) to the driver related to a current vehicle state, the road geometry or conditions, a predicted vehicle state, or any combination thereof. The message may be generated by a controller (not shown) based on data related to the vehicle and road. For example, the message can be a warning message of excessive or insufficient speed, acceleration, or braking or under-steer or over-steer. The message may also include instructions on actions to take, for example how to negotiate or maneuver a corner, obstacle, or road condition. According to various exemplary embodiments, the communication steering wheel 10 may be any steering wheel usable by a driver to steer the vehicle and capable of providing a message to the driver.

Figure 2:
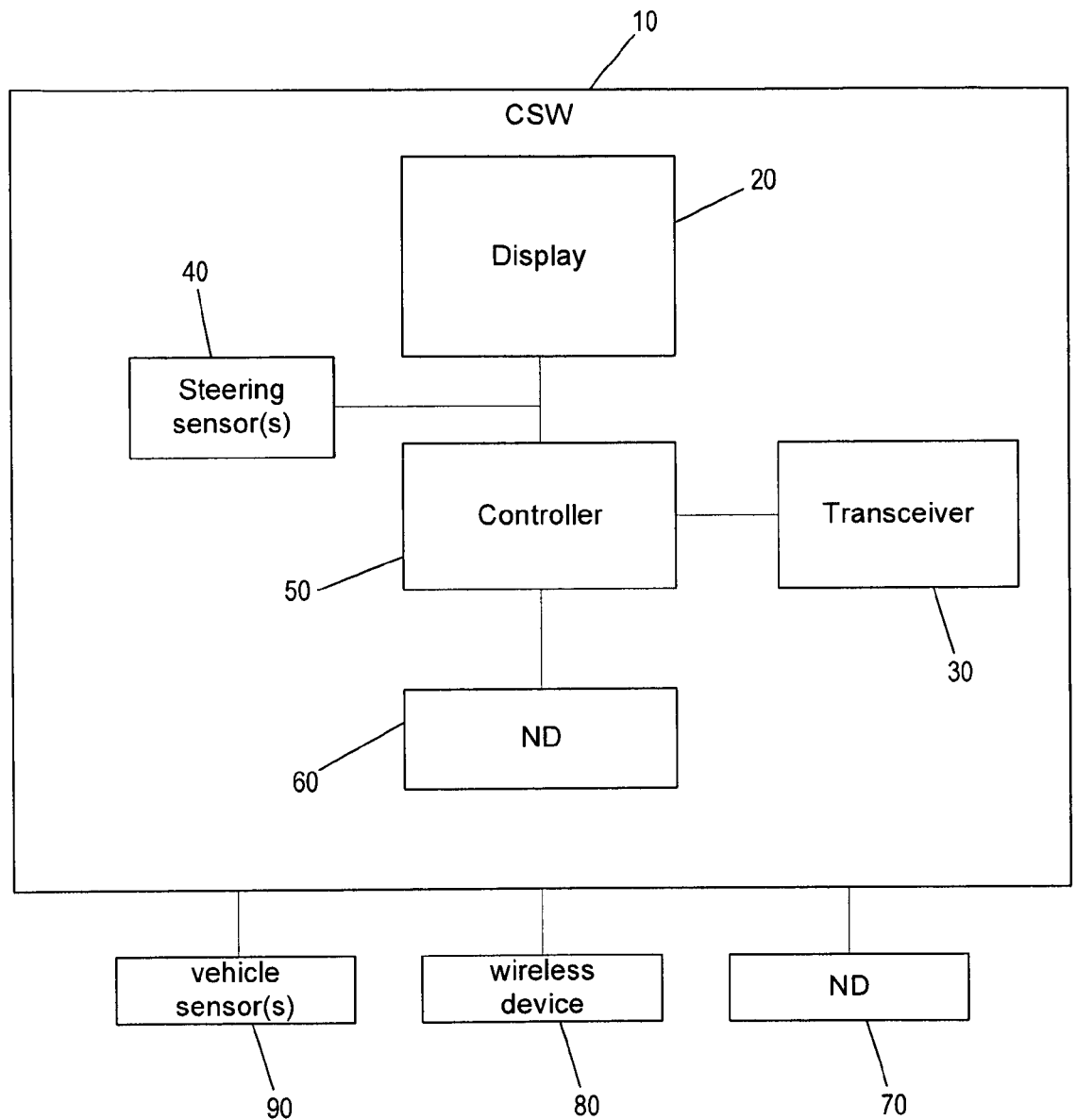
FIG. 2 is a block diagram of a vehicle communication system, according to an exemplary embodiment.

FIG. 2 is a block diagram of a vehicle communication system, according to one embodiment. The communication steering wheel 10 includes a display 20, a wireless transceiver 30, a steering sensor 40 and a controller 50. Preferably, the communication steering wheel 10 also includes a navigation device 60 (e.g., electric compass, GPS, etc.). Alternatively, or in addition, an external navigation device 70 is operatively connected to the communication steering wheel 10. In addition, a wireless device 80 and a vehicle sensor 90 are also operatively connected to the communication steering wheel 10.

The communication steering wheel 10 is configured to output and receive signals (wirelessly and via wires). According to one embodiment, the communication steering wheel 10 is configured to output signals to a wireless device 80 and receive signals from the wireless device 80 via a wireless transceiver 30. The signals can convey information of any type, including but not limited to telephony commands, caller ID information, audio, text, video, images, navigation information, turn-by-turn directions, point of interest information, vehicle information or financial information.

In addition to a display 20 (described in further detail below) the communication steering wheel 10 can include other input and output devices that allow a user to interact with the communication steering wheel. According to one embodiment, the communication steering wheel 10 may include any one of a speaker, a microphone, a light, buttons or switches.

Figure 3:
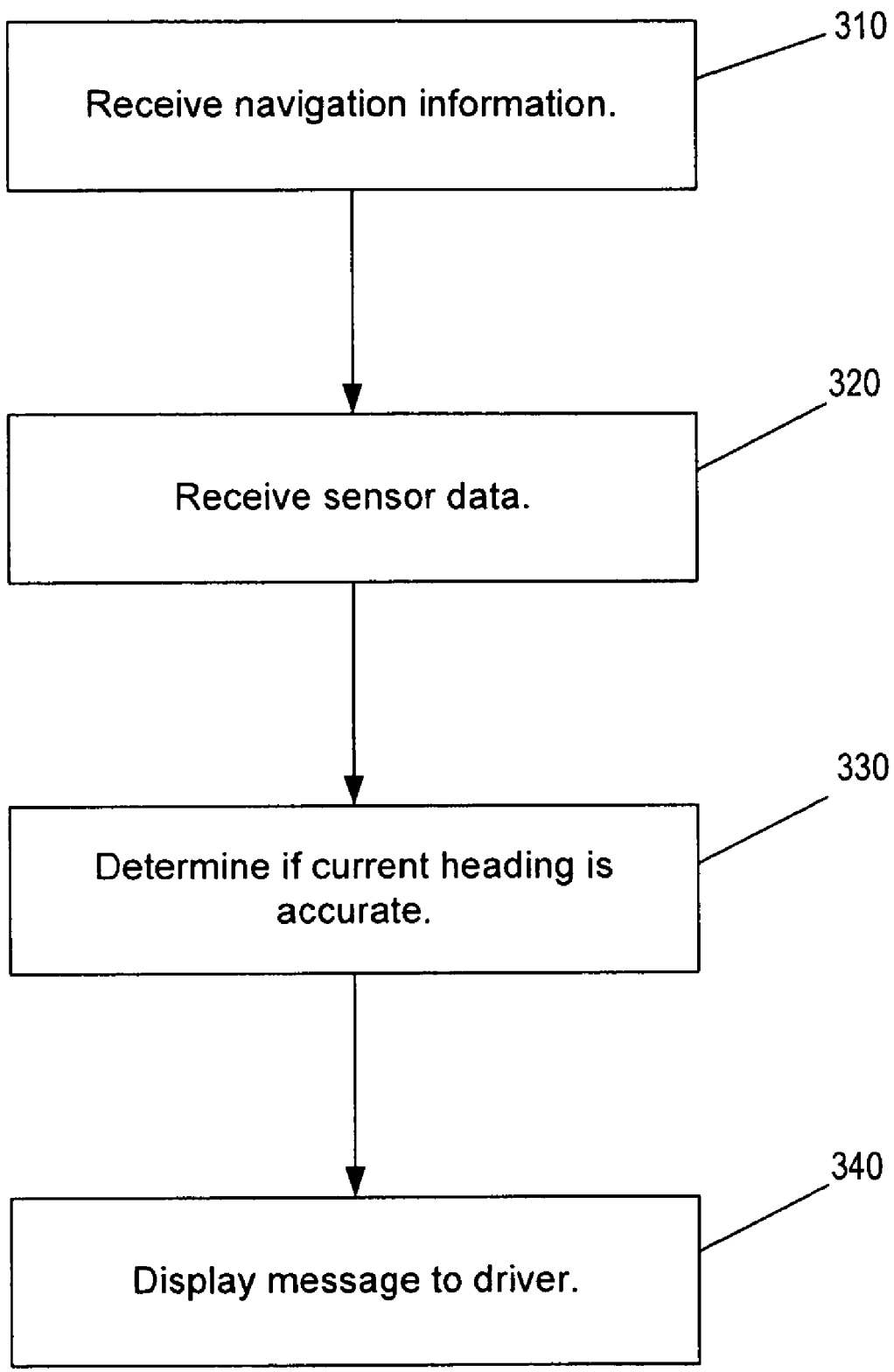
FIG. 3 is a schematic view of a steering wheel including a display, according to an exemplary embodiment.

The display 20 is configured to output information to a driver. The display 20 is incorporated into the communication steering wheel as shown in FIG. 3. According to one embodiment, the display can be anyone of an inorganic LED, an organic LED, an LCD display, a TFT display, an incandescent bulb, a plasma display and a CRT display. In addition, the display can be a touch screen that allows a user to input information by touching the display.

According to one embodiment, the communication steering wheel 10 includes a wireless transceiver 30 that is configured to operably connect to a wireless device 80. The wireless transceiver 30 can communicate with the wireless device 80 using a short-range, low power communication protocol. Preferably, the wireless transceiver 30 communicates with the wireless device 80 using the well known Bluetooth® protocol. Bluetooth is routinely supported in automotive applications for "hands-free" telephony. In the alternative, the wireless transceiver 30 can communicate with the wireless device 80 using a wireless fidelity protocol.

According to one embodiment, the communication steering wheel 10 includes a navigation device 60. Preferably, the navigation device 60 is housed within the communication steering wheel module. In the alternative, or in addition to, a navigation device 70 may be an external device and operably (preferably via a wireless connection) connected to the communication steering wheel 10. The navigation device may be any one of a electronic compass, GPS or well-know navigational system. The navigation device 60 may be used to locate a desired destination of a user. According to one embodiment, the address and/or location of the desired destination may be transmitted to the navigation device 60, 70 using the wireless device 80. Via the display, the navigation system 60 is used to provide turn-by-turn directions to a user. According to another embodiment, the navigation device 60, 70 can conduct a dead reckoning type analysis of vehicle position using vehicle sensor data obtained by the steering wheel sensor 40 and/or vehicle sensors 90 (described in further detail below).

According to one embodiment, the communication steering wheel 10 is configured to communicate with a wireless device 80. Specifically, the wireless device 80 is configured to input data to the controller 50. The wireless device 80 is any one of a cell phone, PDA, laptop or other portable electronic device. According to one embodiment, the wireless device 80 can be built into the vehicle. In the alternative, the wireless device 80 is an external third party device. According to still another embodiment, the wireless device 80 and external navigation device 70 can be embodied in the same physical module. The wireless device 80 also includes a transceiver (not shown) that facilitates communication with the transceiver 30 of the communication steering wheel 10. According to one embodiment, the wireless device 10 can be used to by a user to transmit destination information to the navigation device 60, 70 via wireless transmission (Bluetooth®), which according to one embodiment, eliminates the need for the communication steering wheel 10 to include a cumbersome input device (e.g., keypad, trackball, switches etc.) Navigation information may be entered in a number of ways including but not limited to direct text entry of a street address, selection of a point of interest from a preprogrammed list: such as restaurants, parks, entertainment facilities, etc. or direct entry of GPS coordinates.

According to one embodiment, information may also be provided to the navigation device 60, 70 from various other sensors including a steering sensor 40 and/or vehicle sensors 90. According to one embodiment, the steering wheel sensors 40, vehicle sensors 90 and the navigation device 60,70 may be connected to a CANbus so that information can pass both to and from the navigation system via the data bus. Alternatively, the vehicle sensor data could be passed to the communication steering wheel 10 via the car network (e.g., a data bus) and transmitted/exchanged with the navigation system using a wireless protocol (e.g., Bluetooth).

Figure 4:
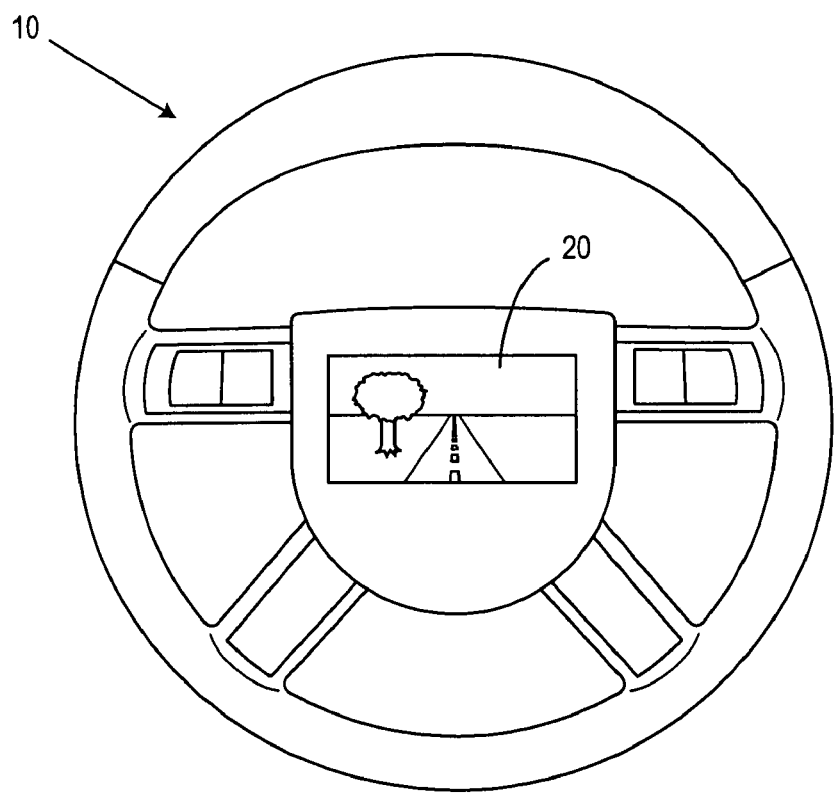
FIG. 4 is process flow diagram of a method for providing driver guidance, according to an exemplary embodiment.

As shown in FIG. 4, information gathered from the sensors 40, 90 can be used in conjunction with navigation data to display a message to a driver. According to one embodiment, the controller 50 receives navigation information from a wireless device 80 via the transceiver 30 (Step 310). As shown in step 320, the controller 50 receives data from one or more sensors 40, 90. Next, the controller 50 determines whether a current heading of the vehicle is accurate based on the received navigation information and received data (Step 330). Then, the controller 50 transmits a signal to the display 20 that causes the display to present a message to the driver based on an accuracy of the current heading (Step 340). According to one embodiment, the message is configured to warn the driver of excessive speed, excessive acceleration, excessive braking, insufficient braking, under-steering or over-steering. According to another embodiment the message is configured to warn the driver of a incorrect heading or incorrect turn. The steering sensors 40 and vehicle sensors 90 will be described in greater detail below.

According to one embodiment, the steering sensor(s) 40 are configured to obtain directional steering information based in a user's operation of the communication steering wheel 10 (e.g., turning) during navigation of a vehicle. The steering sensor(s) 40 are configured to measure at least one of steering wheel angle, steering wheel angle rate, tilt and inertia. According to one embodiment, using the steering sensor(s) 40 the communication steering wheel 10 provides for dimming the communication steering wheel 10 display 20 when the steering wheel is turned away from the normal or 12 o'clock upright position.

For example, the display 20 can be dimmed when turning the communication steering wheel 10 to reduce driver distractions, and raise the display intensity when the steering wheel is returned to the straight or normal position. In addition, using input from the navigation device 60, 70, the brightness of the display 20 may be adjusted or changed to provide a cue to the driver regarding an upcoming turn or other issues that need to be brought to the driver's attention.

In another embodiment, the driver could be alerted or coached (via the display 20 (e.g., brightness)) to achieve the appropriate steering angle to achieve a navigation segment based on information provided by steering sensors 40. For example, a communication steering wheel 10 may include a display 20 wherein the intensity increases when the driver is turning at the ideal angle and dims when the driver moves the steering wheel away from the ideal angle. Similarly, the display 20 color may be used in such a way (e.g., color turns green when the correct steering angle is achieved, and yellow then red when turning at the wrong angle). Data from the navigation device 60, 70 may also be input into the controller 50 so that the display 20 can alert the driver to appropriate or inappropriate movement of the steering wheel.

According to one embodiment, the vehicle communication system includes at least one vehicle sensor 90, configured to collect and provide sensor information about the vehicle to the communication steering wheel 10 and/or an external navigation device 70. The sensor 90 can obtain information including but not limited to a directional heading, acceleration, braking, velocity, yaw, and pitch of the vehicle.

As shown in FIG. 2, the controller 50 is configured to receive input from the wireless transceiver 30 and the steering sensor 40 and output a signal to the display 20 based on the received input. In addition, the controller 50 can use input from the navigation devices 60, 70, and the vehicle sensor 90. The controller 50 may be an analog controller, a digital controller, a software controller, or any combination thereof. According to another embodiment, the controller is configured to initiate communication with third party devices using the wireless device 80.

Preferably, the controller 50 is configured to execute software that allows any external device with wireless communication functionality to operate in conjunction with and/or exchange information with the communication steering wheel 10. Preferably, the software interfaces with the Bluetooth API and can be used for any one of hands-free telephony, audio (e.g., mp3, mp4, etc.) and text data exchange, video and image (e.g., mpeg, jpeg, etc.) data exchange. In addition, in conjunction with the steering sensor 40, the vehicle sensor 90 and the navigation devices 60, 70 the controller's 50 functionality can be applied to navigation information, point of interest information, vehicle operational status, transaction or financial data and information queries.

For example, once a wireless device 80 such as a cell phone or PDA has been enabled, the driver can interact with the cell phone or PDA/Blackberry to receive calls/make calls using the communication steering wheel 10, without direct tactile interaction with the phone. That is, the driver can initiate calls made with the wireless device 80 using an input device of the communication steering wheel 10 (e.g., touch screen, microphone via voice recognition software, physical buttons or switches). Similarly, the driver may accept incoming calls to the wireless device 80 also using an input device of the communication steering wheel 10 (e.g., touch screen, microphone via voice recognition software, physical buttons or switches). For example, caller ID information may be displayed via display 20 to enable a user to decide whether to answer an incoming call to wireless device 80.

The foregoing description has been presented for purposes of illustration and description. It is not intended to be exhaustive or to be limited to the precise form disclosed, and modifications and variations are possible in light of the above teaching or may be acquired from practice of the disclosure. The above-referenced embodiments were chosen and described in order to explain the principles of the disclosure and as a practical application to enable one skilled in the art to utilize the disclosure in various embodiments, and with various modifications, are suited to the particular use contemplated. It should be understood that the following description is intended to describe exemplary embodiments, and not to limit the claimed subject matter.

What is claimed is:

1. A vehicle communication system, comprising:
    a steering wheel, comprising:
        a display configured to out put information to a driver of the vehicle;
        a wireless transceiver configured to operably connect to a wireless device;
        a steering sensor, configured to obtain directional steering information; and
    a controller, configured to receive input from the wireless transceiver and the sensor and output a signal to the display based on the received input; and
    a navigation system, operably connected to the controller, configured to receive input from the wireless device, and
    at least one vehicle sensor, configured to collect and provide sensor information about the vehicle to the navigation system;
    wherein the controller is configured to determine an appropriate movement of the steering wheel based on an input from the navigation system and wherein the controller is configured to change the appearance of the display based on a comparison between the appropriate movement of the steering wheel and the actual movement of the steering wheel determined from the direction steering information.

2. A vehicle communication system, as claimed in claim 1, wherein the sensor information is at least one of directional heading, acceleration, braking, velocity, yaw, and pitch.

3. A vehicle communication system, as claimed in claim 1, wherein the display comprises one or more of an inorganic LED, an organic LED, an LCD display, a TFT display, an incandescent bulb, a plasma display and a CRT display.

4. A vehicle communication system, as claimed in claim 1, wherein the wireless device is any one of a cell phone, PDA, laptop or other portable electronic device.

5. A vehicle communication system, as claimed in claim 1, wherein the steering sensor is configured to measure at least one of steering wheel angle, steering wheel angle rate, tilt and inertia.

6. A vehicle communication system, as claimed in claim 1, wherein the signal can convey information of any one of telephony commands, caller ID information, audio, text, video, images, navigation information, turn-by-turn directions, point of interest information, vehicle information or financial information.

7. A vehicle communication system, as claimed in claim 1, further comprising: a speaker, configured to receive a signal from the controller and output an audio signal.

8. A vehicle communication system, as claimed in claim 1, wherein the controller is configured to change the appearance of the display by altering the intensity of the display.

9. A vehicle communication system, as claimed in claim 1, wherein the controller is configured to change the appearance of the display by altering the color appearing on the display.

* * * * *